(12) United States Patent
Wivagg

(10) Patent No.: US 6,463,114 B1
(45) Date of Patent: Oct. 8, 2002

(54) JACK SCREW GAP REPLACEMENT DEVICE

(75) Inventor: Adrian P. Wivagg, Tolland, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/479,225

(22) Filed: Jan. 7, 2000

Related U.S. Application Data

(60) Provisional application No. 60/129,050, filed on Apr. 13, 1999.

(51) Int. Cl.[7] ............................................. G21C 19/02
(52) U.S. Cl. .................... 376/285; 376/260; 376/372; 254/104
(58) Field of Search ................ 376/287, 285, 376/372; 254/104

(56) References Cited

U.S. PATENT DOCUMENTS

| | | | | |
|---|---|---|---|---|
| 383,035 A | * | 5/1888 | Bell | 254/104 |
| 401,368 A | * | 4/1889 | Piper | 254/104 |
| 1,006,974 A | * | 10/1911 | Moore et al. | 254/104 |
| 1,435,811 A | * | 11/1922 | Cuntala | |
| 1,639,516 A | * | 8/1927 | Langham | 254/104 |
| 2,259,932 A | * | 10/1941 | Hejduk et al. | 254/104 |
| 2,328,661 A | * | 9/1943 | Maloney | 254/104 |
| 2,547,789 A | * | 4/1951 | Skeel | 254/104 |
| 3,021,112 A | * | 2/1962 | Forman | 254/104 |
| 3,390,862 A | * | 7/1968 | Schrepfer | 254/104 |
| 4,142,646 A | | 3/1979 | Wienpahl | 220/22 |
| 4,184,665 A | * | 1/1980 | Queen, Jr. | 254/104 |
| 4,559,986 A | * | 12/1985 | Svensson et al. | 254/104 |
| 4,675,149 A | * | 6/1987 | Perry et al. | 376/260 |
| 4,747,996 A | | 5/1988 | Hale | 378/261 |
| H906 H | * | 4/1991 | Baggett et al. | 254/104 |
| 5,583,899 A | * | 12/1996 | Relf | 376/287 |
| RE35,907 E | * | 9/1998 | Obrecht | 254/104 |
| 5,839,192 A | * | 11/1998 | Weems et al. | 29/890.031 |
| 5,978,433 A | * | 11/1999 | Erbes et al. | 376/372 |
| 6,052,425 A | * | 4/2000 | Erbes et al. | 376/260 |
| 6,053,652 A | * | 4/2000 | Deaver et al. | 403/24 |
| 6,099,199 A | * | 8/2000 | Mullenberg | 403/370 |

FOREIGN PATENT DOCUMENTS

| | | | | |
|---|---|---|---|---|
| DE | 19750684 | | 8/1998 | |
| EP | 0944095 | | 3/1999 | |
| GB | 1551408 | * | 8/1979 | 254/104 |
| GB | 2126190 | * | 3/1984 | 254/104 |
| JP | 6048685 | * | 2/1994 | 254/104 |
| JP | 62170887 | | 7/1997 | |

* cited by examiner

*Primary Examiner*—Harvey E. Behrend

(57) ABSTRACT

A jacking device includes first, second, and third members (51, 52, 53), and a jacking screw (55). The first and second members (51, 52) have sloping side portions (57). The third member (53) has a plurality of sloped side portions (57) and a threaded opening (67) extending from its top portion (69) through to its bottom portion (59). The third member (53) is movably supported between the first and second members (51, 52). The jacking screw (55) engages the threaded opening (67) in the third member (53).

25 Claims, 8 Drawing Sheets

JACK SCREW GAP REPLACEMENT DEVICE

CROSS REFERENCE TO RELATED APPLICATIONS

This application is related to and claims the benefit of U.S. Provisional Application No. 60/129,050, filed on Apr. 13, 1999.

BACKGROUND OF THE INVENTION

1. Field of the Invention

The present invention relates generally to a device that can be installed in the reactor vessel of a boiling water reactor (BWR) to maintain the proper gap between the jet pumps and the riser brackets installed within the riser region of the BWR reactor vessel. More particularly the invention relates to a device that can easily replace existing jet pump jack screws and/or restrain jack screws that have loosened.

2. Description of Related Art

Boiling-water reactors (BWRs) are used for direct-cycle type power production. In other words, the reactor and steam plant are essentially one and the same. Thus, there is no separate primary coolant system and secondary steam plant system.

FIG. 1 depicts the elementary features of a conventional BWR plant. In the BWR plant 10, the reactor coolant is converted to steam within the reactor vessel 12, the steam is then directed to turbine generators 14, is condensed, and fed back to the reactor vessel as feed water. The feed water enters the reactor vessel and has its flow adjusted through the core by the recirculation system.

The recirculation system 20 of a BWR plant, depicted more specifically in FIG. 2, comprises recirculation pumps 22, jet pumps 24, and interconnecting piping 26 and valves 28. Feed water enters the reactor vessel annulus 32, located between the reactor vessel 12 and the core shroud 13. The feed water flows down the annulus 32, upward through the core region 34 and exits as steam. The circulation through the core is maintained by the recirculation system 20. This recirculated water is directed via the recirculation pumps 22, at high pressure and velocity, to the jet pumps 24, which enhances the total flow of feed water through the jet pumps 24.

A typical jet pump installation arrangement is shown in FIGS. 3 through 5. In the depicted arrangement, two jet pumps 24 are installed in the reactor vessel annulus 32. The jet pumps comprise an inlet 21, a mixer 23, and a diffuser 25. The jet pumps are aligned and laterally supported by a restrainer 27 that is connected to a riser 29. The riser 29 receives the incoming flow from the recirculation pumps 22 and directs the flow to the jet pump inlets 21. As shown more particularly in FIGS. 4 and 5, the jet pumps are held in vertical alignment by a riser bracket 31. The riser bracket 3 1 physically abuts the riser 29 and encompasses the jet pumps 24 in the pump mixer region 23. Lateral restraint within the riser bracket 31 is maintained by a wedge 33, and a plurality of jackscrews 35 positioned around the periphery of the jet pumps 24.

The recirculation pumps 22 and jet pumps 24 control coolant flow rate through the BWR core region 34. Moreover, as a result of the negative reactivity feedback mechanism of the coolant (e.g., void feedback), these pumps can affect core power level and power distribution in the core. Thus, it is important that the jet pumps 24 operate optimally. This in turn requires that the jet pumps 24 be maintained in vertical alignment. This vertical alignment, as noted above, is in part provided by the jackscrews 35 positioned around the periphery of the jet pumps 24. When the jet pumps 24 are installed and aligned, the jackscrews are adjusted and then welded in place. During operation, however, a gap can develop between a jet pump 24 and one or more jackscrews, due to operational vibrations. Typically, the maximum tolerable gap is on the order of 0.01 inches, and if this gap tolerance is exceeded, the welds must be broken and the jackscrews replaced. This type of repair is both time-consuming and costly. Additionally, the jackscrew welds may be broken, allowing the jackscrews to become loosened and fall into the reactor vessel. If broken welds are discovered during an outage, repair must be effected.

Hence, there is a need in the art for a device that can provide lateral support for BWR jet pumps to maintain their vertical alignment, without effecting costly repairs. There is also a need for a device that can restrain existing jackscrews whose welds have broken, thereby preventing them from falling out.

SUMMARY OF THE INVENTION

It is therefore a principal object of the present invention to provide a jacking device that maintains the proper vertical alignment of BWR jet pumps, when the gap between the jet pump and existing jackscrews is too large.

It is another object of the present invention to provide a clamping device, used in combination with the jacking device, that restrains existing jackscrews whose welds may become broken due to the effects of operational vibrations.

It is yet another object of the present invention to provide a method for installing the above-described devices in the vessel of a BWR.

In one aspect of the present invention, a jacking device includes first, second, and third members, and a jacking screw. The first and second members have sloping side portions. The third member has a plurality of sloped side portions and a threaded opening extending from its top portion through to its bottom portion. The third member is movably supported between the first and second members. The jacking screw engages the threaded opening in the third member.

In another aspect of the present invention, a jacking device for use with a BWR jet pump includes first and second jack blocks, a wedge piece, and a jacking screw. The jack blocks each include sloping side portions having a slot extending in the direction of the slope, and a dual-chamfered side portion positioned opposite the sloping side portion. The wedge piece is positioned between the sloping side portions of jack blocks and includes a plurality of sloped side portions. These sloped side portions each include a slope coextensive with one of the sloping side portions and a projecting portion that engages one of the slots. The wedge piece also includes a threaded opening extending through it from top to bottom. The jackscrew engages the threaded opening.

In yet another aspect of the present invention, a jacking device for providing contact between a jet pump and a riser bracket includes first jacking means, second jacking means, wedge means, and adjustment means. The first jacking means contacts an outer surface of the jet pump, and is movable in a first direction. The second jacking means contacts a surface of the riser bracket, and is movable in a second direction, opposite to the first direction. The wedge means moves the first and second jacking means in the first and second lateral directions, and is positioned between the first and second jacking means and is movable in a third direction, perpendicular to both the first and second directions. The adjustment means moves the wedge means in the third direction.

In still another aspect of the present invention, a jacking device for use with a boiling water reactor jet pump and riser bracket includes first and second jack blocks, a wedge piece, a jacking screw, a washer, a clamp, and a clamp screw. The jack blocks each include sloping side portions having a slot extending in the direction of the slope, and a dual-chamfered side portions positioned opposite the sloping side portions. The wedge piece is positioned between the sloping side portions of the jack blocks and includes a plurality of sloped side portions. These sloped side portions each include a slope coextensive with one of the sloping side portions and a projecting portion that engages one of the slots. The wedge piece also includes a threaded opening extending through it from top to bottom. The jackscrew engages the threaded opening. The washer is supported on top portions of both jack blocks and has an opening through which the jackscrew extends. The clamp is supported on an end, proximate the dual-chamfered side, of one of the jack blocks. The clamping screw extends through a threaded opening in the clamp and into a clamp screw opening in one of the jack blocks.

In still a further object of the present invention, a method of providing lateral alignment between a BWR jet pump and a riser bracket includes the steps of positioning a jacking device between the jet pump and riser bracket, and rotating a jacking screw. The jacking device includes first and second blocks, and a third block positioned between them. The jacking screw is rotated into a threaded opening of the third block to thereby move it in a vertical direction. The third block's vertical movement causes horizontal movement of the first and second blocks. The rotation of the jacking screw is continued until the horizontal movement brings the first and second blocks into contact with the jet pump and riser bracket.

DETAILED DESCRIPTION OF THE PREFERRED EMBODIMENT

Figure 6:
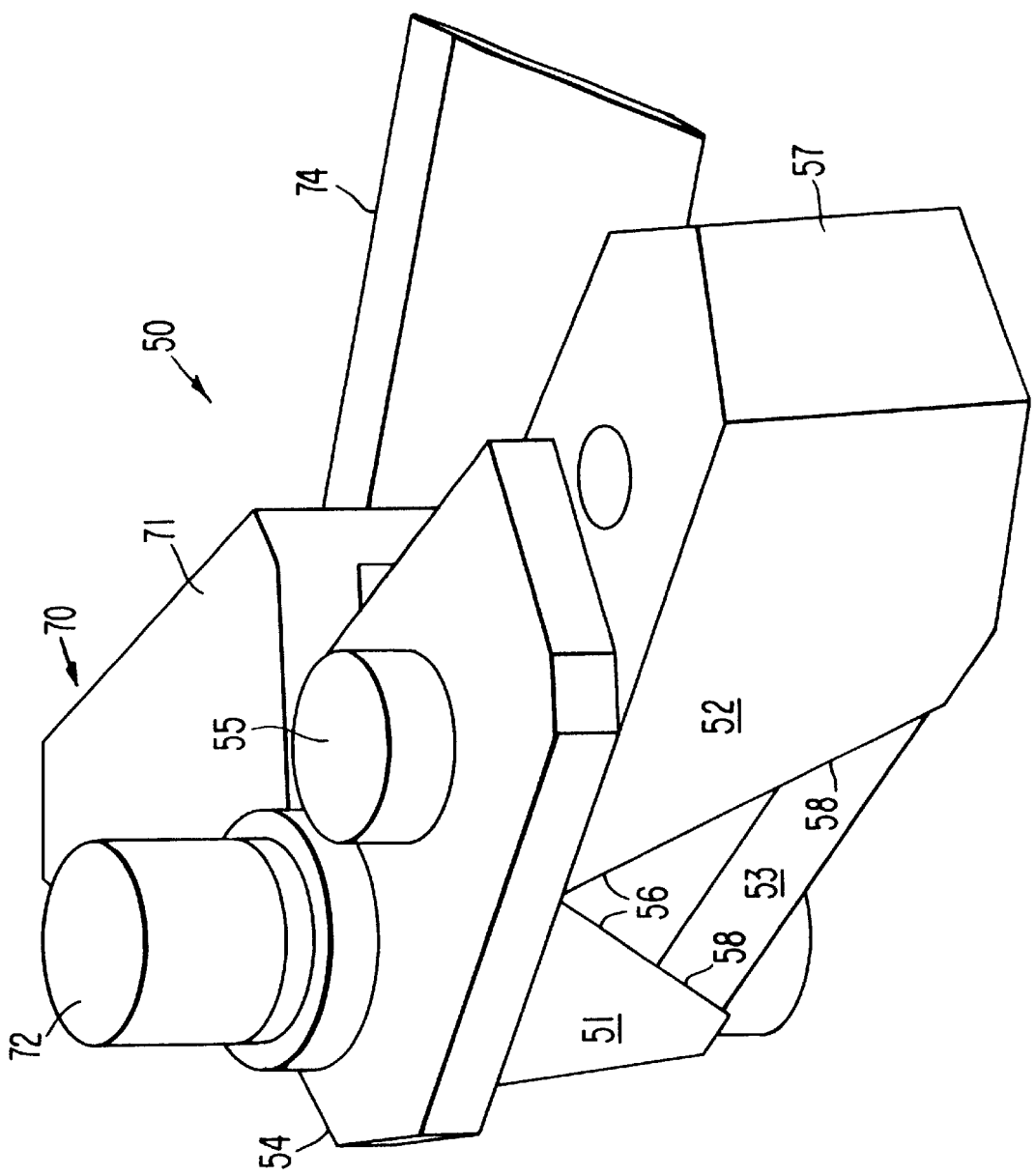
FIG. 6 is an isometric view of a jack screw gap replacement device according to a preferred embodiment of the present invention.

An isometric view of a jack screw replacement device 50 according to an embodiment of the present invention is shown in FIG. 6. The device 50 can serve a dual purpose. First, the device 50 can functionally replace defective jackscrews 35. Second, the device 50 can restrain jackscrews 35 that may become loosened during plant operation, as discussed above. The device 50 comprises two jack blocks 51, 52, a wedge 53, a jack washer 54, and an adjustment screw 55. The device also accommodates a clamp 70, which will be described in more detail later. The jack blocks each have sloping sides 56, and a dual-chamfered side 57 positioned opposite the sloped side 56. The wedge 53 has a plurality of sloped sides 58, a top portion 69, and a bottom portion 59, and is movably positioned between the jack blocks 51, 52. The sloped sides 58 are coextensive (e.g., have equivalent slopes) with the sloping sides 56. The adjustment screw 55 extends through the jack washer 54, between the sloping sides 56 of the blocks 52, 54, and into a threaded opening 67 in the wedge 53 that extends from the top portion 69 to the bottom portion 59.

Figure 7A:
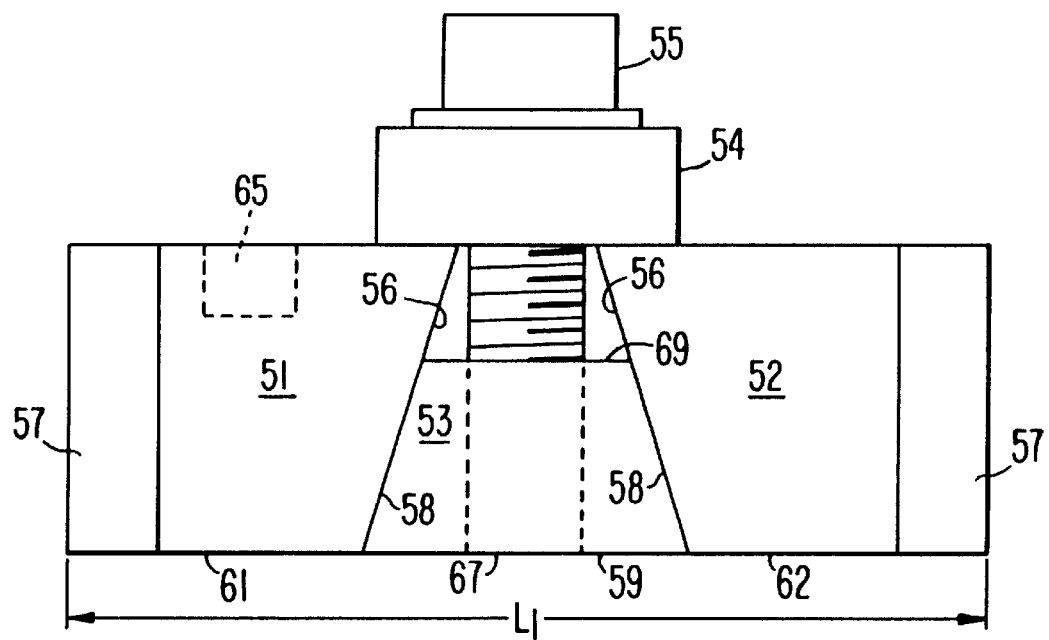
FIGS. 7a and 7a depict side views of the device of FIG. 6 in differing states of length.
Figure 7B:
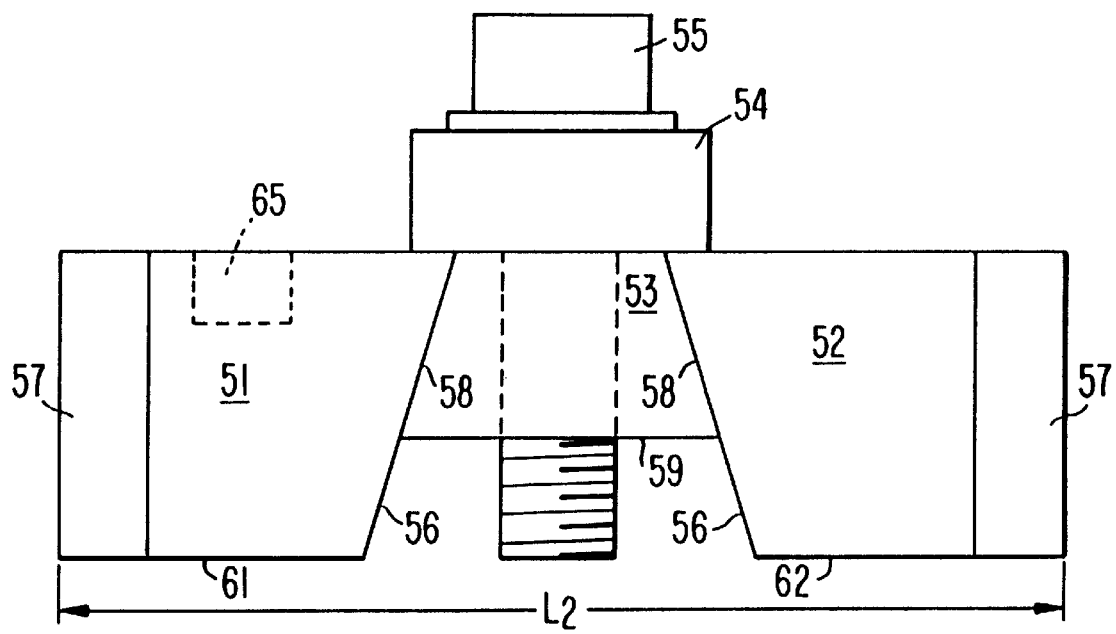
Figure 8:
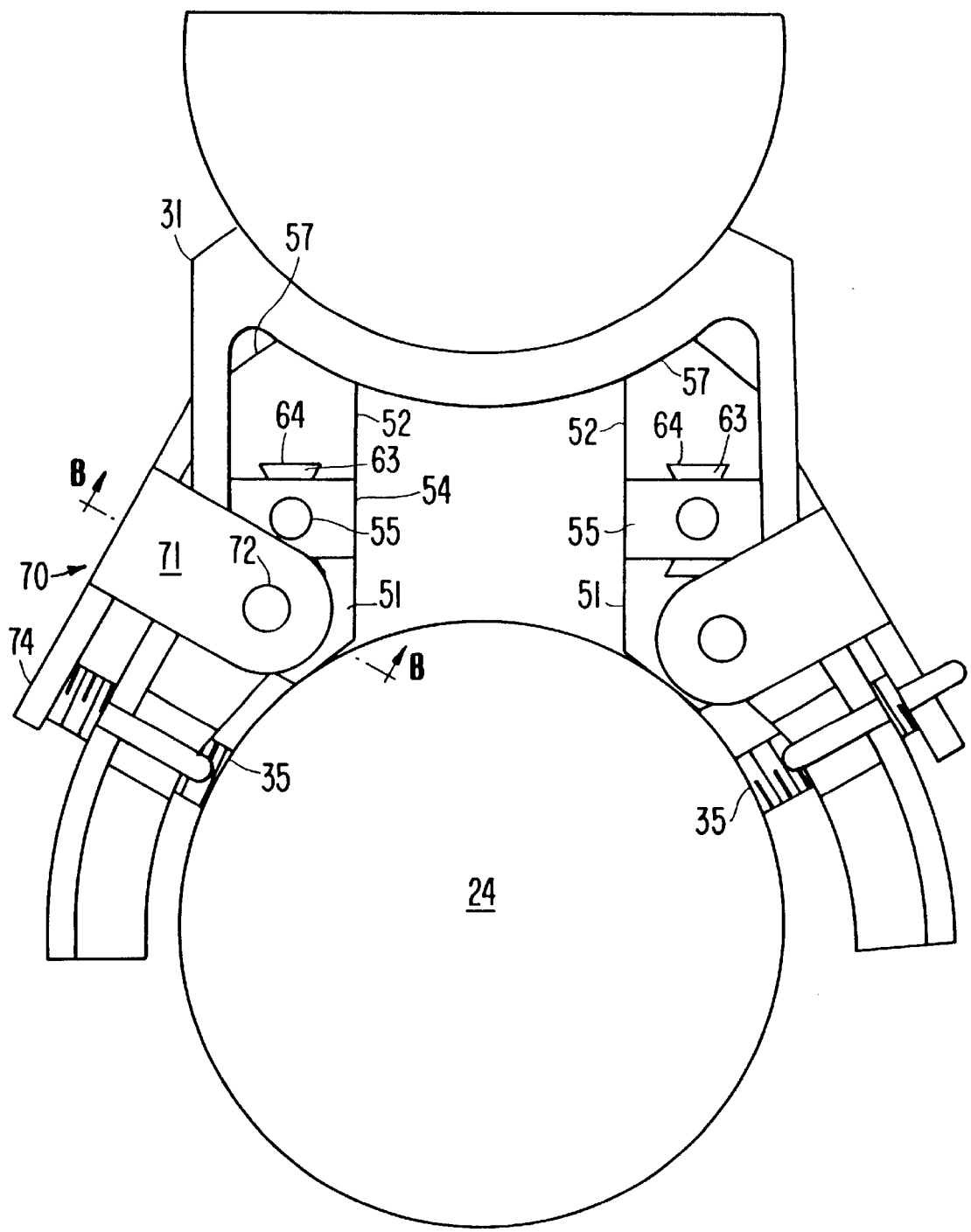
FIG. 8 depicts a section view, similar to that of FIG. 5, with a jack screw gap replacement device according to a preferred embodiment installed.
Figure 9:
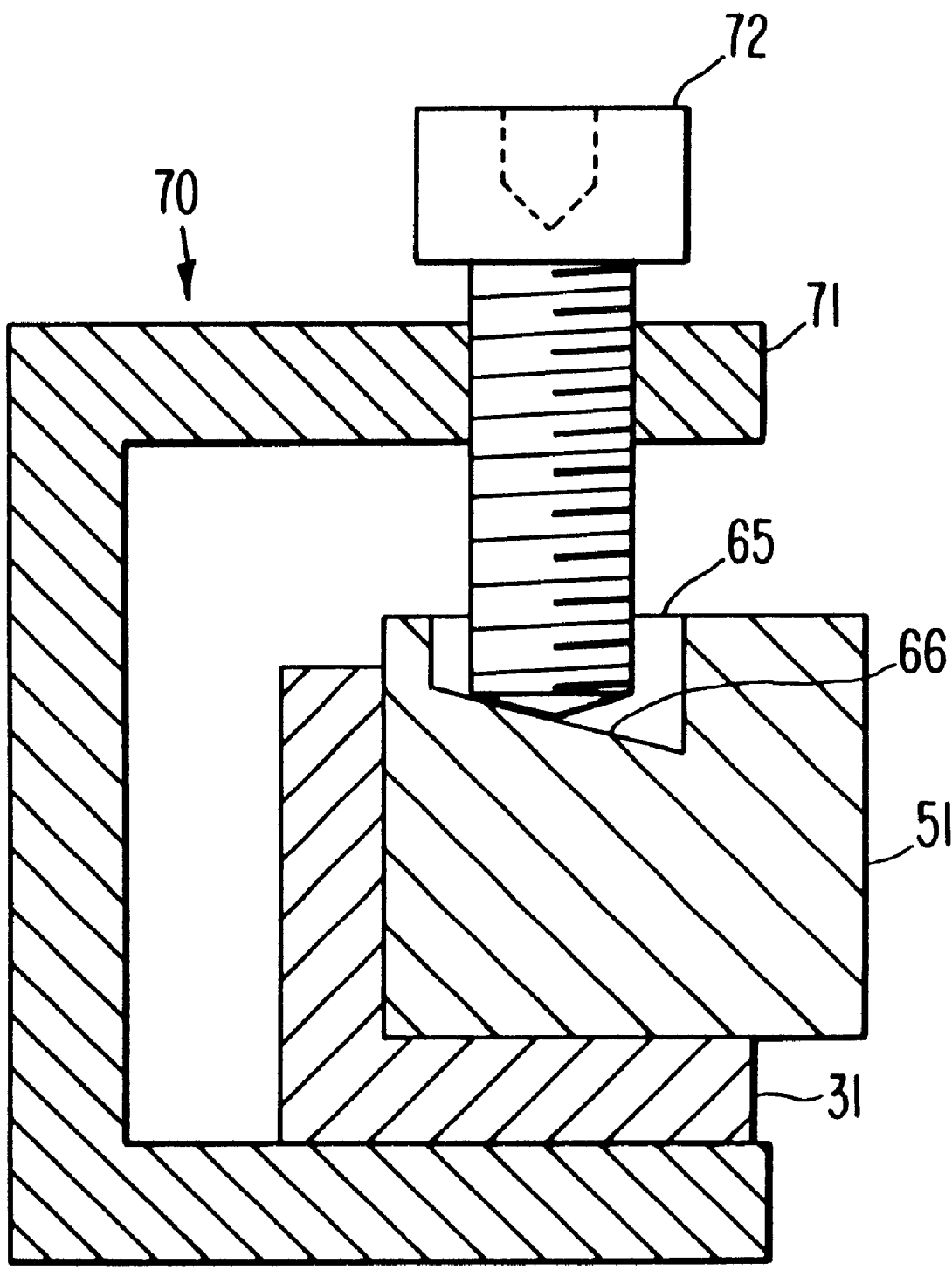
FIG. 9 is a section view taken along line B—B of FIG. 8.

FIGS. 7a and 7b depict a side view of the device 50 in two differing states. As can be seen in FIG. 7a, when the wedge 53 is positioned such that its bottom portion 59 is flush with the bottom portions 61, 62 of the jack blocks, 51, 52, the device takes on a first length $L_1$. However, when the adjustment screw 55 is rotated into threaded opening 67, the wedge 53 moves upward. Thus, the jack blocks 51, 52 are moved further apart, and the device takes on a second length $L_2$, longer than $L_1$ As shown in FIG. 8, this movement between the jack blocks 51, 52 and the wedge 53 is maintained in alignment by an interlocking arrangement. The wedge 53 includes extensions 63 that slide within slots 64 in each of the jack blocks 51, 52 (see FIG. 8). These extensions 63 and slots 64 are of any type of interlocking configuration, but in a preferred embodiment are dove tail type interlocking keys. The jack washer 54 is also interlocked to blocks 51, 52, although not shown. At least one of the jack blocks 51, 52 is also provided with an opening 65 proximate the dual-chamfered side 57. The opening 65 extends partially through the jack block 51,52 and has a bottom portion 66 that is slanted (see FIG. 9). The purpose of the slanted bottom 66 will be discussed further below.

Figure 1:
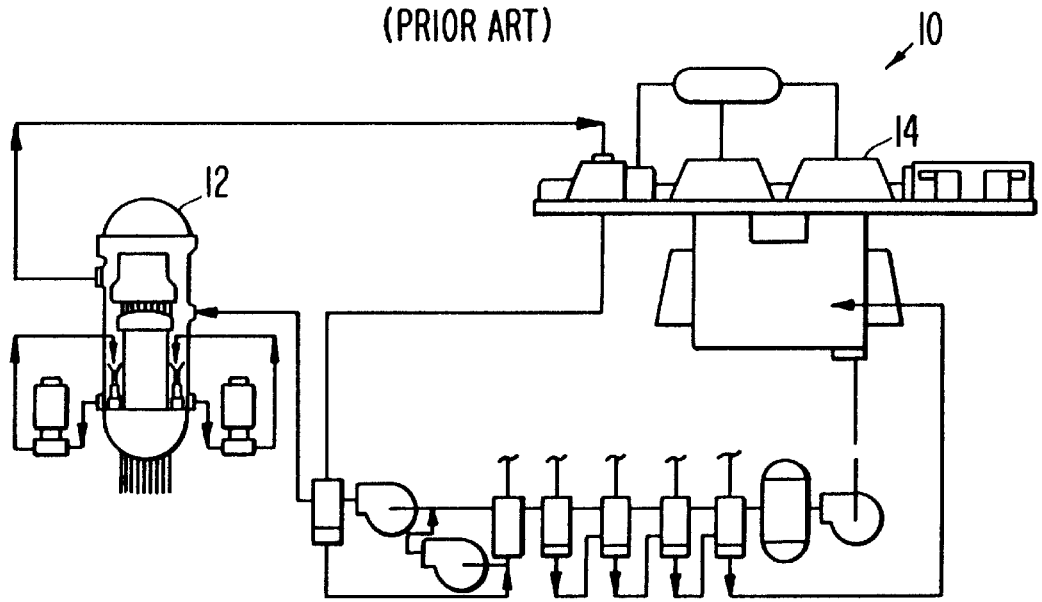
FIG. 1 depicts a schematic representation of a conventional BWR power cycle.
Figure 2:
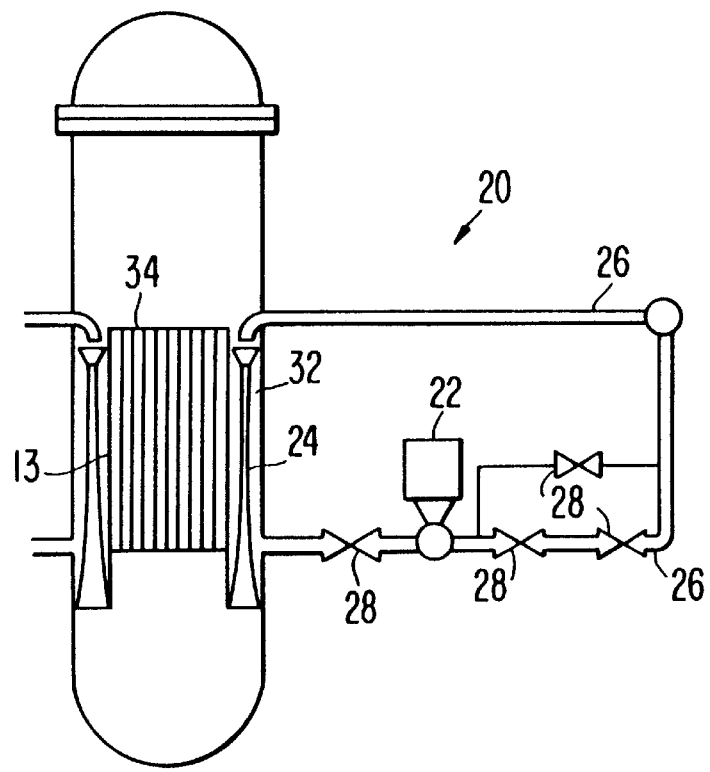
FIG. 2 depicts a schematic representation of a conventional jet pump recirculation system for a BWR power cycle.
Figure 3:
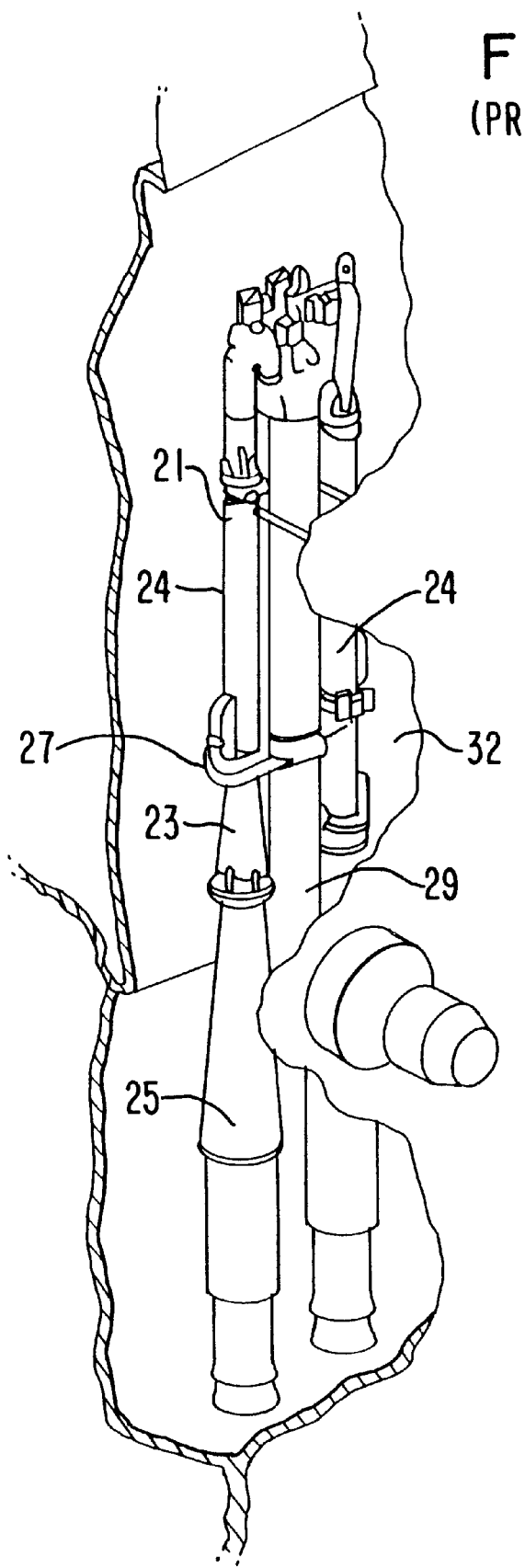
FIG. 3 depicts an isometric view of a jet pump installation into which the present invention can be installed.
Figure 4:
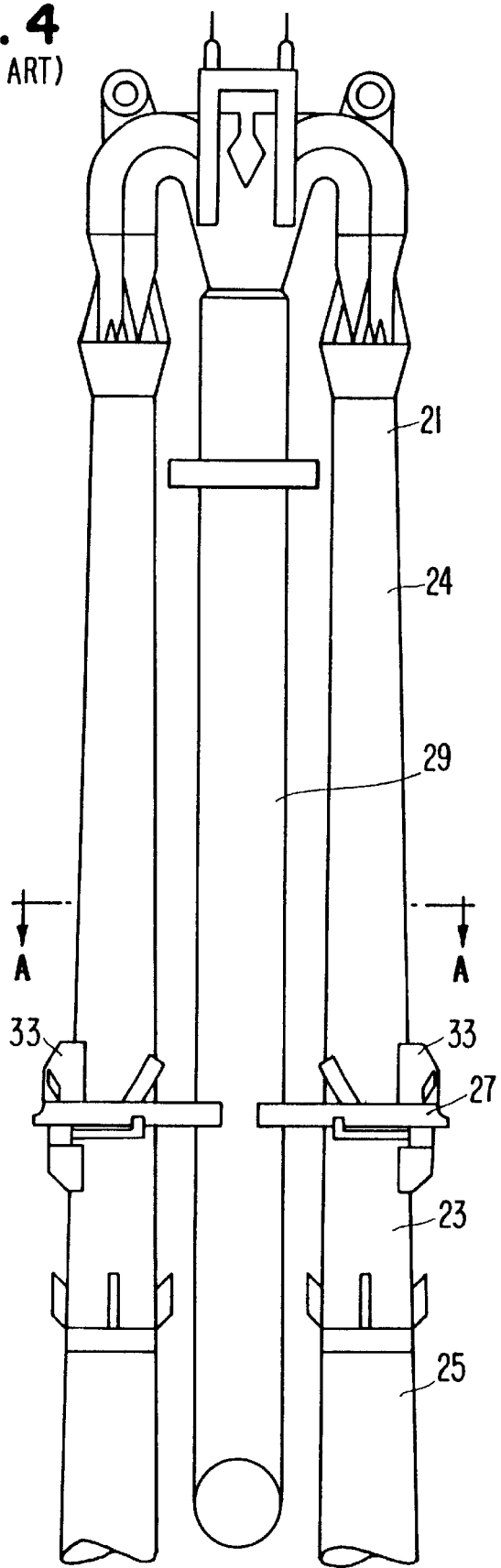
FIG. 4 is a front plan view of a jet pump installation into which the present invention can be installed.
Figure 5:
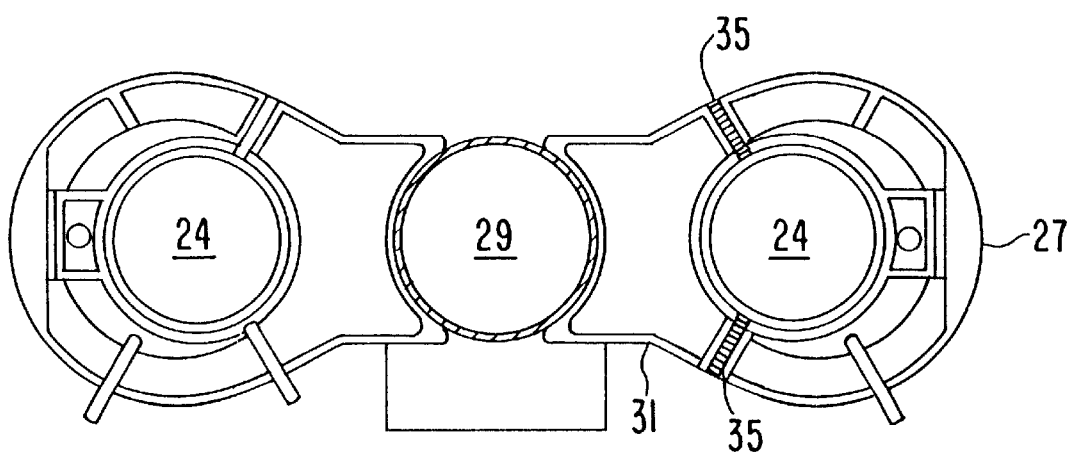
FIG. 5 is a section view taken along line A—A of FIG. 4.

As noted above, the device 50 can also accommodate a clamp 70. The clamp 70 may be configured to have a generally C-shaped cross section. Of course, other types of cross sectional configurations can be used, as would be clear to the ordinarily skilled artisan. FIG. 6 depicts the salient features of the clamp 70, including the main body portion 71 that substantially surrounds the dual-chamfered side 57 of one of the jack blocks 51, 52 (51 in the Figure). A clamp screw 72 extends through a threaded opening 73 and, when the clamp 70 is installed on the device 50, the jack screw is accommodated in the above-described jack block opening 65. The clamp 70 also includes a wing portion 74 extending from the main body portion 71. Referring now to FIG. 8, a top view of the jet pump 24 lateral alignment, similar to that of FIG. 5, is shown, depicting the device 50 and clamp 70 installed in the riser region of a BWR vessel. As shown, the device 50 physically abuts the riser bracket 31 and jet pump mixer 23 via the dual-chamfered sides 57. The clamp 70 holds the device 50 in place on the riser bracket 31. This is accomplished by inserting the clamp body 71 around the riser bracket 31 and the end portion of the jack block 51, 52 abutting the jet pump 24 (51 is shown in the Figure). The clamp wing portion 74 extends from the main body portion 71 and abuts the riser bracket 31 at one of the wing portion 74 ends, and physically abuts and covers one of the installed jack screws 35 at the other end of the wing portion 74.

A procedure for installing the device 50 and clamp 70 will now be described with reference again to FIG. 8. The device 50 is adjusted to its shortest length by rotating the adjustment screw 55 to move the wedge 53 downward. The device is then positioned into the riser region, using tooling having sufficient length to reach the riser region from near the vessel head opening, until the device 50 is in the region between the riser bracket 31 and jet pump 24. Then, using long tooling, the adjustment screw 55 is rotated to move the wedge 53 upward, thereby lengthening the device 50. This rotation is continued until the dual-chamfered sides 57 abut both the riser bracket 31 and jet pump 24.

After the jacking device is in place, the clamp 70 is then lowered into the riser region, and placed around both the riser bracket 31 and the end portion of the jack block 51 or 52 abutting the jet pump 24. The clamp 70 is moved horizontally over these components until the wing portion 74 touches a jack screw 35 at one end and the riser bracket 31 at the other. The clamp screw 72 is then rotated into the jack block opening 65. Because the opening 65 has a slanted bottom 66, as the clamp screw 72 is tightened, the clamp 70 is pulled toward the riser bracket 31. Thus, the wing portion 74 is pulled closer to the riser bracket 31 and jack screw 35 as the clamp screw 72 is tightened. Thus, should the jack screw 35 weld fail, the jack screw 35 will be held in place by the wing portion 74.

Once the clamp screw 72 has been tightened to the desired preload, the adjustment screw 55 can be tightened again to assure good contact. Each of the clamp screw 72 and the adjustment screw 55 can then be crimped in place to prevent further rotation in either direction.

Another salient feature of the geometry of the jacking device 50 and the clamp 70, is that if a jacking screw 75 does become loosened, it will apply a force to the wing portion 74. This outward force on the wing portion 74 will in turn create a force against the device 50 toward the jet pump 24 and riser bracket 31.

I claim:

1. A jacking device for use in a boiling water reactor comprising:
   a first member having a sloping side portion and an oppositely positioned end portion;
   a second member having a sloping side portion and an oppositely positioned end portion;
   a third member having a plurality of sloped side portions slidably contacting said sloping side portions of said first and second members and a threaded opening extending from a top portion through to a bottom portion, said third member being movably supported between said sloping side portions of said first and second members for moving said first and second members relative to each other when said third member moves between them;
   an adjustment screw engaged with said threaded opening; and
   a clamp having a body portion attached to either said first or second member and a protuberant wing extending from said body portion beyond said end portion of said first or second member.

2. A jacking device for use in a boiling water reactor according to claim 1, further comprising:
   a washer having at least one opening extending therethrough, said washer being supported on top portions of said first and second members, and wherein said adjustment screw extends through said opening.

3. A jacking device for use in a boiling water reactor according to claim 1, wherein said clamp is supported on a top portion, and extends at least partially around said end portion, of either of said first or second members; and said body member is attached to said first or second member by a clamping screw extending through a threaded clamp opening in said clamp and into a clamp screw opening extending partially through said end portion of either of said first or second members.

4. A jacking device for use in a boiling water reactor according to claim 3, wherein said clamp further comprises a second protuberant wing extending therefrom.

5. A jacking device for use in a boiling water reactor according to claim 3, wherein said clamp screw opening has a sloped bottom.

6. A jacking device for use in a boiling water reactor according to claim 3, wherein said clamp has a substantially C-shaped cross section.

7. A jacking device for use in a boiling water reactor according to claim 1, wherein said end portions of said first and second members include obliquely extending side portions positioned opposite said sloping side portions.

8. A jacking device for use in a boiling water reactor according to claim 1, wherein each of said first and second members further comprise an engagement slot extending from a bottom of said sloping side portion to a top of said sloping side portion.

9. A jacking device for use in a boiling water reactor according to claim 8, wherein each of said sloped side portions of said third member further comprise a projecting portion dimensioned so as to be inserted in one of said engagement slots.

10. A jacking device for use in a boiling water reactor according to claim 9, wherein aid engagement slots and said projecting portions interlock via dove-tail tongue-in-groove keying.

11. A jacking device for use with a boiling water reactor jet pump comprising:
   a) first and second jack blocks, each of said first and second jack blocks comprising:
      (i) a sloping side portion, said sloping side portion including a slot, in at least a portion thereof, extending in a direction from a bottom to a top of said sloping side portion, and
      (ii) an end portion positioned opposite said sloping side portion;
   b) a wedge piece positioned between said sloping side portions of said first and second jack blocks, said wedge piece comprising:
      (i) a plurality of sloped side portions, each of said sloped side portions including (1) a slope coextensive with one of said sloping side portions and (2) a projecting portion which engages one of said slots, and
      (ii) a threaded opening extending through said wedge piece from a top portion to a bottom portion;
   c) an adjustment screw engaged with said threaded opening; and
   d) a clamp having a body portion supported on one of said first and second jacking blocks and having a protuberant wing extending from said body portion to beyond one of said end portions of said first or second members.

12. A jacking device for use with a boiling water reactor jet pump according to claim 11, further comprising:
   e) a washer supported on top portions of said first and second jack blocks, said washer having a first opening extending therethrough, and wherein said adjustment screw extends through said first opening.

13. A jacking device for use with a boiling water reactor jet pump according to claim 11 wherein said clamp is supported on said end portion, proximate an oblique side, of one of said first and second jacking blocks; further comprising:

f) a clamp screw opening extending partially through said end portion of one of said first and second jacking blocks; and g) a clamping screw extending through a threaded clamp opening in said clamp and into said clamp screw opening of said end portion.

14. A jacking device for use with a boiling water reactor jet pump according to claim 13, wherein said clamp screw opening of said end portion has a sloped bottom portion.

15. A jacking device for use with a boiling water reactor jet pump according to claim 11 wherein each said projecting portion interlocks a corresponding one of said slots via a dove-tail keying.

16. A jacking device for use with a boiling water reactor jet pump according to claim 11, wherein said clamp further comprises a second protuberant wing extending therefrom.

17. A jacking device for providing contact between a jet pump and a riser bracket in a boiling water reactor, comprising:

first jacking means for contacting an outer surface of said jet pump, said first jacking means being movable in a first direction;

second jacking means for contacting a surface of said riser bracket, said second jacking means being movable in a second direction, opposite to said first direction;

wedge means for moving said first and second jacking means in the first and second lateral directions, said wedge means positioned between said first and second jacking means and being movable in a third direction, perpendicular to both the first and second directions, adjustment means for moving said wedge means in the third direction;

clamp means for clamping said jacking device to said riser bracket;

means for fastening said clamp means to one of said first or second jacking means; and wing means, having first and second ends, for (1) contacting said riser bracket at said first end and (2) covering a jack screw extending through said riser bracket at said second end.

18. A jacking device for providing contact between a jet pump and a riser bracket in a boiling water reactor according to claim 17, further comprising:

washer means for maintaining said adjustment means in its set position.

19. A jacking device for providing contact between a jet pump and a rises bracket in a boiling water reactor according to claim 17, further comprising:

means for biasing said clamp means toward said riser bracket upon tightening said means for fastening, said means for biasing being located in at least one of said first and second jacking means.

20. A jacking device for providing contact between a jet pump and a riser bracket in a boiling water reactor according to claim 19, wherein said means for biasing comprises an opening having a sloped bottom portion.

21. A jacking device for use with a boiling water reactor jet pump and riser bracket, said jacking device comprising:

a) first and second jack blocks, each of said first and second jack blocks comprising:

(i) a sloping side portion, said sloping side portion including a slot, in at least a portion thereof, extending in a direction from a bottom to a top of said sloping side portion, and (ii) an end portion having an oblique side positioned opposite said sloping side portion;

b) a wedge piece positioned between the sloping side portions of said first and second jack blocks, said wedge piece comprising:

(i) a plurality of sloped side portions, each of said sloped side portions including (1) a slope coextensive with one of said sloping side portions and (2) a projecting portion which engages one of said slots, and (ii) a threaded opening extending through said wedge piece from a top portion to a bottom portion;

c) an adjustment screw engaged with said threaded opening;

d) a washer supported on top portions of said first and second jack blocks, said washer having a first opening extending therethrough, wherein said adjustment screw extends through said first opening;

e) a clamp supported or an end portion, proximate said oblique side, of one of said first and second jacking blocks; said clamp having a protuberance extending beyond said oblique side;

f) a clamp screw opening extending partially through said end portion of one of said first and second jacking blocks; and g) a clamp screw extending through a threaded clamp opening in said clamp and into said clamp screw opening of said end portion, wherein said clamp screw opening of said end portion has a sloped bottom portion.

22. A jacking device for use in a boiling water reactor according to claim 3, wherein said clamp screw has a diameter and said clamp screw opening of the first or second member is larger than said clamp screw diameter.

23. A jacking device for use in a boiling water reactor according to claim 11, wherein said clamp screw has a diameter and said clamp screw opening of the first or second jacking blocks is larger than said clamp screw diameter.

24. A jacking device for use in a boiling water reactor according to claim 17, wherein said means for fastening said clamp means to one of said first or second jacking means comprises a clamp screw having a diameter that extends into a clamp screw opening in said first or second jacking means and said clamp screw opening is larger than said clamp screw diameter.

25. A jacking device for use in a boiling water reactor according to claim 21, wherein said clamp screw has a diameter and said clamp screw opening of the first or second jacking blocks is larger than said clamp screw diameter.

* * * * *